United States Patent
Lev et al.

(10) Patent No.: US 11,593,578 B1
(45) Date of Patent: Feb. 28, 2023

(54) DATA ENCODING IN PRINTED MATERIAL USING VARYING IR REFLECTIVE MATERIALS

(71) Applicant: NEC Corporation Of America, Herzlia (IL)

(72) Inventors: Tsvi Lev, Tel-Aviv (IL); Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 17/399,086

(22) Filed: Aug. 11, 2021

(51) Int. Cl.
*G06K 7/12* (2006.01)
*G06K 7/14* (2006.01)

(52) U.S. Cl.
CPC .............. *G06K 7/12* (2013.01); *G06K 7/1413* (2013.01); *G06K 7/1417* (2013.01)

(58) Field of Classification Search
CPC ....... G06K 7/12; G06K 7/1413; G06K 7/1417
See application file for complete search history.

(56) References Cited

U.S. PATENT DOCUMENTS

2019/0384955 A1* 12/2019 Frieser .................. G06V 30/40

* cited by examiner

*Primary Examiner* — Matthew Mikels

(57) ABSTRACT

Disclosed herein are methods and systems for encoding data in composite patterns such that the encoded data is perceptible in one or more infrared spectral ranges while significantly imperceptible in visible light spectral range by encoding the data in one or more first partial patterns and/or in one or more second partial patterns of the composite pattern where the first partial pattern(s) is painted using a first print material and the second partial pattern(s) is painted using a second. The first and second paint materials are characterized by reflecting substantially similar light in the visible light spectral range and significantly different light in the infrared spectral range(s) such that the first and second patterns are indistinguishable in the visible light spectral range while highly distinguishable in the infrared spectral range(s). further disclosed are methods and systems for decoding the composite patterns to decode and extract the encoded data.

6 Claims, 14 Drawing Sheets

VISIBLE SAME PAINT

VISIBLE TWO PAINTS (MIX)

NIR SAME PAINT 402B

NIR TWO PAINTS (MIX) 404B

VISIBLE SAME PAINT

902A

VISIBLE TWO PAINTS (MIX)

904A

DATA ENCODING IN PRINTED MATERIAL USING VARYING IR REFLECTIVE MATERIALS

FIELD AND BACKGROUND OF THE INVENTION

The present invention, in some embodiments thereof, relates to patterns perceptible in infrared spectral range, and, more specifically, but not exclusively, to patterns comprising multiple partial patterns highly indistinct in visible light spectral range while highly perceptible in infrared spectral range.

Encoding data in patterns, for example, text, symbols, icons and/or the like has been a way to convey data to human viewers, readers and/or the like from the time of ancient history.

The constant and rapid technological advance has seen the introduction of automated systems capable of decoding such encoded data for a plurality of applications ranging from gaming, social media and/or commerce applications, through automated and autonomous systems, vehicles and/or the like to medical, security, public order and military applications.

SUMMARY OF THE INVENTION

According to a first aspect of the present invention there is provided a method of decoding data encoded in patterns perceptible in infrared spectral range, comprising using one or more processors for:
  Receiving one or more infrared images depicting, in one or more infrared spectral ranges, a composite printed pattern comprising at least a first partial pattern printed using a first paint material and a second partial pattern printed using a second paint material. The first and second paint materials are characterized by: (1) light reflected by the first paint material in visible light spectral range deviates less than a first value from the light reflected by the second paint material, and (2) light reflected by the first paint material in the one or more infrared spectral ranges deviates more than a second value from the light reflected by the second paint material.
  Analyzing the one or more infrared images to identify the first partial pattern and/or the second partial pattern separated from each other.
  Decoding data encoded in the first partial pattern and/or in the second partial pattern.

According to a second aspect of the present invention there is provided a system for decoding data encoded in patterns perceptible in infrared spectral range, comprising one or more processors configured to execute a code, the code comprising:
  Code instruction to receive one or more infrared images depicting, in one or more infrared spectral ranges, a composite printed pattern comprising at least a first partial pattern printed using a first paint material and a second partial pattern printed using a second paint material. The first and second paint materials are characterized by: (1) :light reflected by the first paint material in visible light spectral range deviates less than a first value from the light reflected by the second paint material, and (2) light reflected by the first paint material in one or more infrared spectral ranges deviates more than a second value from the light reflected by the second paint material.
  Code instruction to analyze the one or more infrared image to identify the first partial pattern and/or the second partial pattern separated from each other.
  Code instruction to decode data encoded in the first partial pattern and/or in the second partial pattern.

According to a third aspect of the present invention there is provided a method of encoding data in patterns perceptible in infrared spectral range, comprising using one or more processors for:
  Receiving data.
  Encoding the received data creating in one or more first partial patterns and one or more second partial patterns.
  Computing instructions for printing one or more composite printed patterns comprising the one or more first partial patterns and the one or more second partial patterns, the one or more first partial patterns are printed using a first paint material and the one or more second partial patterns are printed using a second paint material.
  Outputting the instructions for printing the one or more composite printed patterns.
Wherein the first and second paint materials are characterized by: (1) light reflected by the first paint material in visible light spectral range deviates less than a first value from the light reflected by the second paint material, and (2) fight reflected by the first paint material in one or more infrared spectral ranges deviates more than a second value from the light reflected by the second paint material.

According to a fourth aspect of the present invention there is provided a system for encoding data in patterns perceptible in infrared spectral range, comprising one or more processors configured to execute a code, the code comprising:
  Code instruction to encode the received data creating in one or more first partial patterns and one or more second partial patterns.
  Code instruction to compute instructions for printing one or more composite printed patterns comprising the one or more first partial patterns and the one or more second partial patterns, the one or more first partial patterns are printed using a first paint material and the one or more second partial patterns are printed using a second paint material.
  Code instruction to output the instructions for printing the one or more composite printed patterns;
Wherein the first and second paint materials are characterized by: (1) light reflected by the first paint material in visible light spectral range deviates less than a first value from the light reflected by the second paint material, and (2) light reflected by the first paint material in one or more infrared spectral ranges deviates more than a second value from the light reflected by the second paint material.

According to a fifth aspect of the present invention there is provided a composite printed pattern encoding data in a plurality of partial patterns perceptible in infrared spectral range, comprising at least a first partial pattern printed using a first paint material and a second partial pattern printed using a second paint material. The first and second paint materials are characterized by: (1) light reflected by the first paint material in visible light spectral range deviates less than a first value from the light reflected by the second paint material, and (2) light reflected by the first paint material in one or more infrared spectral ranges deviates more than a second value from the light reflected by the second paint material. Wherein one or more data items are encoded in the first partial pattern and/or in the second partial pattern.

In a further implementation form of the first, second, third, fourth and/or fifth aspects, the first value equals 20% and the second value equals 35%.

In a further implementation form of the first, second, third, fourth and/or fifth aspects, the one or more infrared spectral ranges are members of a group consisting of: near infrared (NIR) having a wavelength in a range of 750-1400 nanometer, and/or short wave infrared (SWIR) having a wavelength in a range of 1400-3000 nanometer.

In a further implementation form of the first and second aspects, the first partial pattern is distinguished from the second partial pattern according to a threshold of infrared light reflection in the one or more infrared spectral ranges applied to each of a plurality of pixels of the one or more infrared images. Wherein each pixel reflecting infrared light exceeding the threshold is mapped to one of the first pattern or the second pattern while each pixel reflecting infrared light not exceeding the threshold is mapped to the other pattern.

In a further implementation form of the first and second aspects, the threshold is selected in a range defined by the second value.

In a further implementation form of the first, second, third, fourth and/or fifth aspects, the first partial pattern and the second partial pattern are each composed of a plurality of blotches.

In an optional implementation form of the first and second aspects, one or more background flattening algorithms are applied to flatten the one or more infrared images are prior to the analysis.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
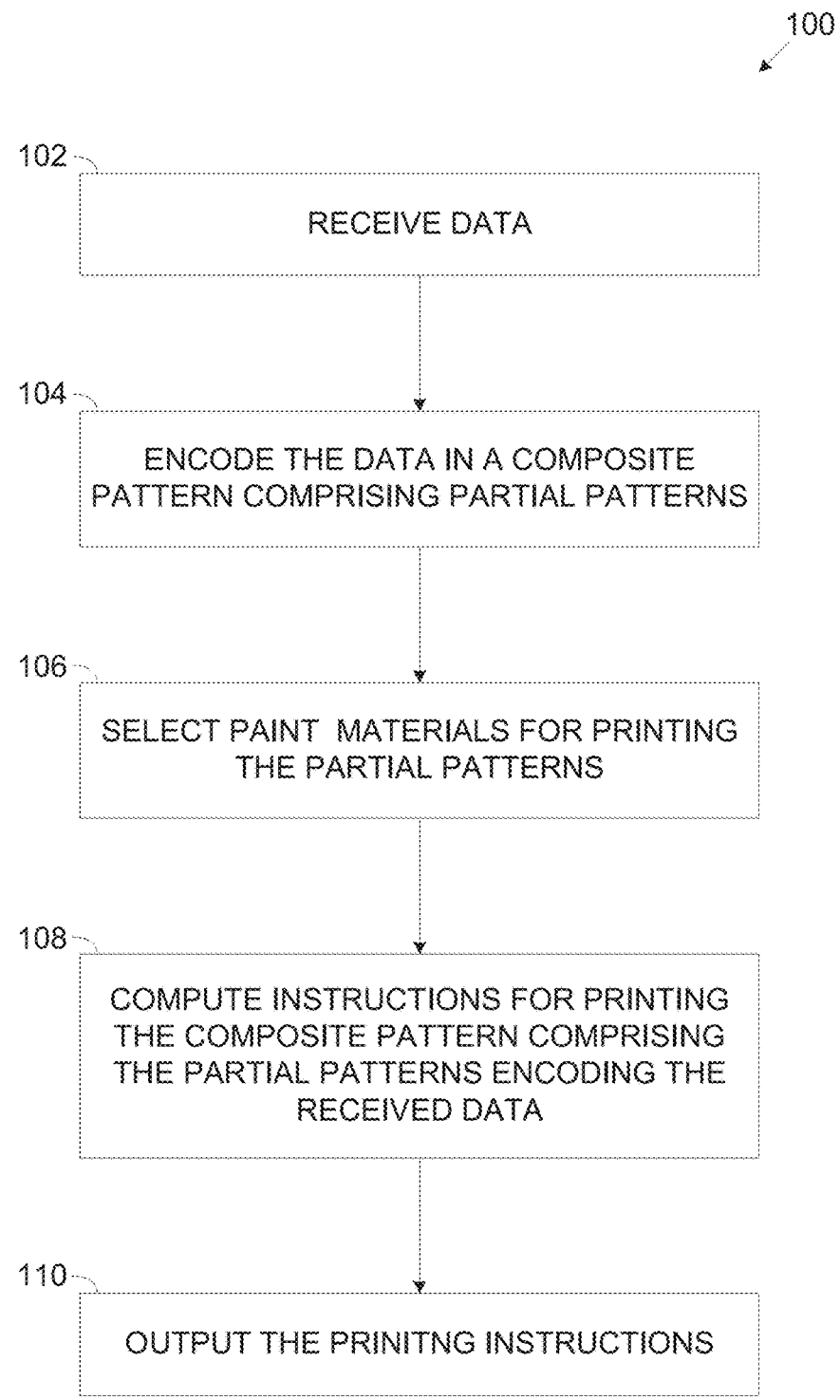
FIG. 1 is a flowchart of an exemplary process of computing instructions for encoding data in a printed composite pattern comprising a plurality of partial patterns perceptible in infrared spectrum while imperceptible in visible light spectrum, according to some embodiments of the present invention.

The present invention, in some embodiments thereof, relates to patterns perceptible in infrared spectral range, and, more specifically, but not exclusively, to patterns comprising multiple partial patterns highly indistinct in visible light spectral range while highly perceptible in infrared spectral range.

According to some embodiments of the present invention, there are provided methods, systems and computer program products for encoding data in one or more printed composite patterns each constructed of a plurality of partial patterns which are highly visible in one or more infrared spectral ranges, for example, Near Infrared (NIR), Short Wave Infrared (SWIR) and/or the like while significantly imperceptible in the visible light spectral range.

A plurality of partial patterns jointly constituting a respective composite pattern may be printed using a plurality of infrared reflective ink and/or paint materials which are characterized by reflecting substantially similar light in the visible light spectral range while in one or more of the infrared spectral ranges, each ink and/or paint material may reflect infrared light which significantly deviates from the infrared light reflected by the other ink and/or paint materials.

Specifically, the light reflected by each of the ink and/or paint materials used to print the plurality of partial patterns of the composite pattern may in the visible light spectral range (400-700 nanometer) may deviate by less than a first value, for example, 15%, 20%, 25% and/or the like from the light reflected by the other ink and/or paint materials. In addition, the light reflected by each of the ink and/or paint materials in one or more of the infrared spectral ranges, for example, NIR (750-1400 nanometer), SWIR (1400-3000 nanometer) and/or the like may deviate by more than a second value, for example, 30%, 35%, 40% and/or the like from the light reflected by each of the other ink and/or paint materials.

The deviation in light reflection between the two ink and/or paint materials may be expressed in terms of one or more visibility values and/or metrics, for example, a level of reflected light, a wavelength of the reflected light and/or the like which may translate to color, brightness, intensity, contrast and/or the like.

As such, the partial patterns constituting the composite pattern may be significantly visually indistinct (indistinguishable) from each other thus appearing as a single uniform pattern, while in the infrared spectral range(s) the partial patterns may be significantly visually distinct (distinguished) from each other.

Data may be encoded in one or more of the partial patterns of the printed composite patterns such that the encoded data may be highly imperceptible in the visible light spectral range and thus significantly invisible to human viewers while decodable by one or more pattern detection systems adapted to operate in the infrared spectral range(s). Such infrared capable systems may analyze one or more images of the printed composite patterns, specifically infrared images of the composite pattern captured in the infrared spectral range(s) to decode the data encoded in one or more of the partial patterns of the printed composite patterns.

The composite pattern encoding the data may be printed on one or more substrates and/or surfaces, for example, paper, fabric, metal, wood and/or the like for one or more applications. For example, one or more composite patterns may be printed and/or marked on one or more products to encode data and/or information relating to the marked product. Such composite patterns may be analyzed and used by one or more systems for one or more applications, for example, a quality control system, a customs enforcement system and/or the like which may decode the data encoded and monitor, evaluate, validate and/or the like the products. In another example, one or more composite patterns may be printed in one or more road segments, for example, on road surface, on a traffic sign, on a traffic light pole and; or the like to encode data relating to the road segment. Such composite patterns may be analyzed and used by one or more systems for one or more applications, for example, a vehicle control and/or navigation system data and/or the like which may decode the data encoded in the composite pattern(s) and use the decoded information accordingly.

The term imperceptible as used here in through the document defines objects, markings, printing and/or the like, in particular composite and/or partial patterns which may not be perceived by the human eye since they reflect substantially similar light in the visible light spectrum. While the partial patterns may be visually distinct (different) from each other in the infrared spectral range(s), since these spectral ranges are out of the visible light spectrum, the human eye is incapable of detecting these differences.

Optionally, one or more of the plurality of partial patterns jointly forming the composite pattern may be each composed of a plurality of small size blotches.

Encoding data in partial pattern forming a composite pattern using the infrared reflective paint materials may present major advantages and benefits compared to currently existing data encoding methods and systems.

First, while the human perception and recognition of encoded data may be limited, automated pattern detection systems having substantial computing resources may capture, identify, detect, recognize, analyze and process significantly large volumes of encoded data. These automated vehicular systems may therefore identify, extract and/or use the data encoded in the composite patterns which is perceptible only in the infrared spectral range(s) and therefore imperceptible to the human eye thus preventing visual clutter and potential visual overload of human viewers' perception.

Moreover, data encoded in patterns which are printed to be seen in the visible light spectral range may be subject to degradation, distortion and/or the like due to one or more visual effects, for example, reflections, mirroring, background effect and/or the like which are highly common in the visible light spectrum. In contrast, such visual effects are significantly reduced and potentially non-existing in the infrared spectral range(s) thus significantly increasing identification and detection of the data encoded in the printed composite patterns.

Furthermore, printing each of the plurality of partial patterns of the printed composite pattern as a collection a plurality of blotches printed using a respective infrared reflective ink and/or paint material may significantly reduce the ability of human viewers to differentiate, in the visible light spectral range, between the plurality of partial patterns. Human viewers may be unable to distinguish between the blotches of the one partial pattern from the blotches of another partial pattern since the blotches occupy only a small portion of the area of the composite pattern where the background is unpainted thus a human viewer may be unable to differentiate between very small printed areas that are printed using very similar ink and/or paint materials to begin with.

In addition, some of the existing methods and systems may encode data such that it is imperceptible to the human eye using techniques and technologies that may require special illumination to emphasize, highlight and/or expose the encoded data. Encoding the data in the partial patterns which are perceptible such that the encoded data is perceptible only in the infrared spectral range(s) may enable simple pattern detection systems to effectively and accurately detect the encoded data with no need for special and/or specific illumination means that may significantly increase cost of the system and/or complicated the decoding process.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of computing instructions for encoding data in a printed composite pattern comprising a plurality of partial patterns perceptible in infrared spectrum while imperceptible in visible light spectrum, according to some embodiments of the present invention.

An exemplary process 100 may be executed for computing instructions for encoding data in one or more printed composite patterns each constructed of a plurality of partial patterns which are highly visible in one or more infrared spectral ranges (e.g. NIR, SWIR, etc.) while significantly imperceptible and thus practically invisible in the visible light spectral range.

In particular, in the visible light spectral range, the plurality of partial patterns of the composite pattern may be visually significantly indistinct (indistinguishable) from each other such that they may appear as a single pattern while in the infrared spectral range(s) the partial patterns may be easily distinct (distinguished). This may be accomplished by printing each of the plurality of partial patterns of a respective composite pattern using a plurality of ink and/or paint materials which reflect substantially similar visible light while reflecting significantly different infrared light.

As such, the partial patterns may be used to encode data that may be highly perceptible and visible in the infrared spectral range(s) while highly imperceptible in the visible light spectral range.

One or more infrared capable systems, apparatuses and/or devices, collectively designated pattern detection systems may analyze one or more images of the printed composite patterns, specifically infrared images captured in the infrared spectral range(s) to decode the data encoded in the partial patterns of each of the printed composite patterns.

The printed composite patterns may therefore encode data which is highly imperceptible in the visible light spectral range and thus invisible to human users while decodable by the infrared capable pattern detection systems.

Figure 2:
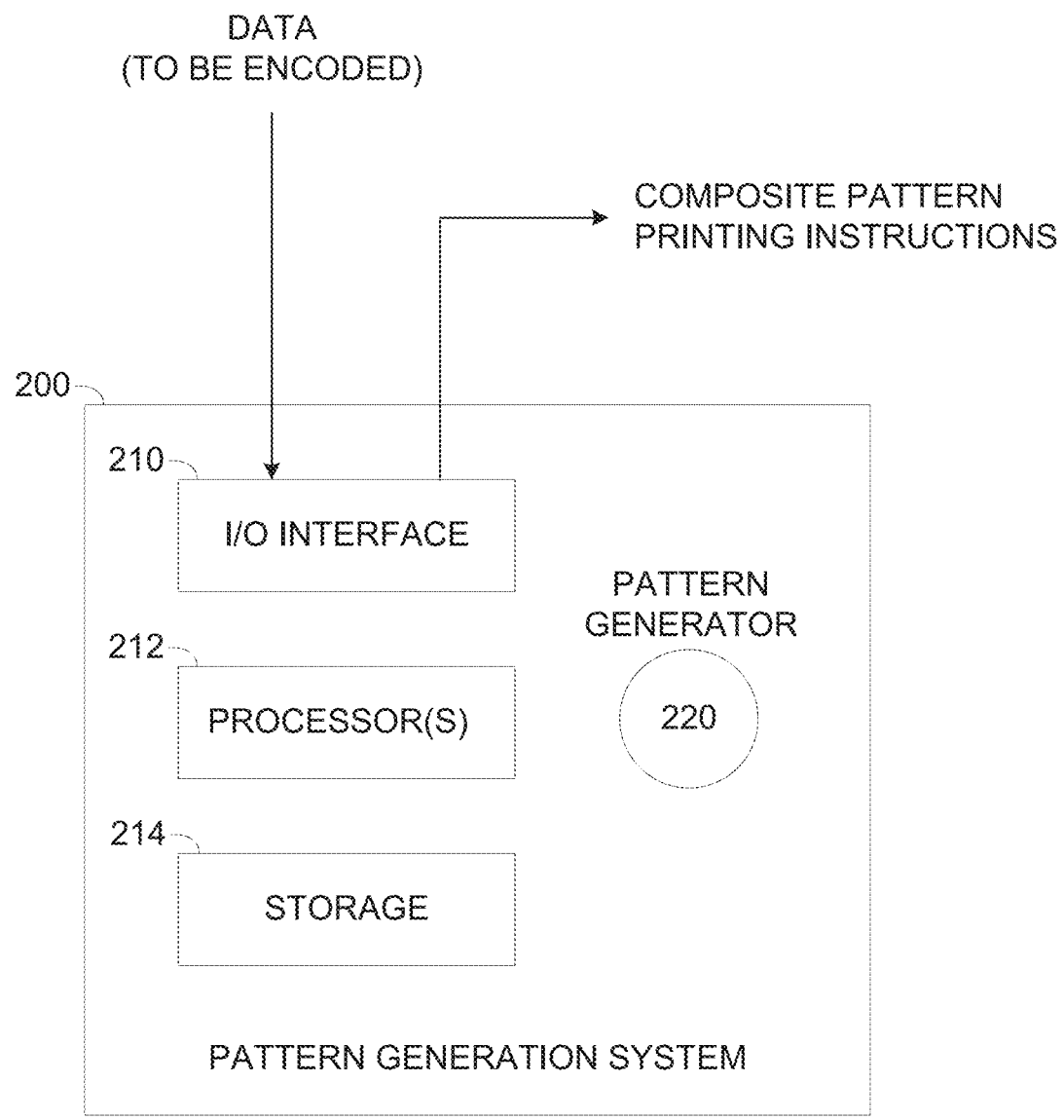
FIG. 2 is a schematic illustration of an exemplary system for computing instructions for encoding data in a printed composite pattern comprising a plurality of partial patterns perceptible in infrared spectrum while imperceptible in visible light spectrum, according to some embodiments of the present invention.

Reference is also made to FIG. 2, which is a schematic illustration of an exemplary system for computing instructions for encoding data in a printed composite pattern comprising a plurality of partial patterns perceptible in infrared spectrum while imperceptible in visible light spectrum, according to some embodiments of the present invention.

An exemplary pattern generation system 200, for example, a computer, a server, a processing node, a cluster of computing nodes and/or the like may be configured to execute a process such as the process 100 for computing instructions for printing one or more composite patterns each constructed of a plurality of partial patterns which are highly visible in one or more infrared spectral ranges while significantly imperceptible and thus practically invisible in the visible light range.

The pattern generation system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the pattern generation system 200 may obtain, for example, fetch, receive, acquire and/or the like data that needs to be encoded in one or more composite patterns. For example, the pattern generation system 200 may connect to one or more of the networks, through the network interface(s) available in the I/O interface 210, to communicate with one or more networked resources storing data to be encoded. In another example, the pattern generation system 200 may access one or more attachable devices attached to interconnection interface(s) available in the I/O interface 210, for example, a USB storage device storing data to be encoded.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the pattern generation system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a pattern generator 220 functional module for executing the process 100 to compute instructions for printing one or more of the composite patterns each encoding at least part of the received data in one or more of a plurality of partial patterns.

The pattern generator 220 may further output the printing instructions computed for printing the composite pattern(s) using the plurality of ink and/or paint materials.

Optionally, the pattern generation system 200, specifically the pattern generator 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like.

For brevity, the process 100 executed by pattern generator 220 is described for computing instructions for printing a single composite patter constructed of a plurality of partial patterns. This, however, should not be construed as limiting since the process 100 may be scaled and expanded for computing printing instructions for a plurality of composite patterns each comprising a plurality of respective partial patterns.

As shown at 102, the process 100 starts with the pattern generator 220 receiving data to be encoded in a composite pattern that may be printed on one or more surfaces.

The pattern generator 220 may receive the data to be encoded coupled with encoding instructions indicting how to encode the data in the composite pattern, for example, numeric coding, symbolic coding, barcode, QR code and/or the like.

The pattern generator 220 may further receive one or more attributes of the composite pattern, specifically attributes which may affect the printing of the composite pattern, its visibility and/or appearance. The composite pattern attributes may include, for example, visual attributes such as, for example, a shape, a size, a color, a texture and/or the like. In another example, the composite pattern attributes may include one or more surface attributes, for example, parameters, characteristics and/or attributes of one or more of surfaces on which the composite pattern is to be printed, for example, a material, a texture, a color and/or the like.

As shown at 104, the pattern generator 220 may encode the received data in a composite pattern comprising a plurality of partial patterns which combined together construct the composite pattern.

The pattern generator 220 may create the composite pattern to include a plurality of partial patterns, a plurality of partial pattern types and/or a plurality of partial pattern groups. However, for brevity and without limitation, the process 100 is described for a composite pattern comprising two partial pattern types, one or more first partial patterns and one or more second partial patterns.

The pattern generator 220 may therefore create the composite pattern to include one or more first partial pattern and one or more second partial patterns.

The pattern generator 220 may then encode the received data in the composite pattern, specifically in one or more of the partial patterns, for example, in one or more of the first partial patterns, in one or more of the second partial patterns and/or in a combination thereof.

In particular, the pattern generator 220 may create the composite pattern to encode the received data according to the encoding instructions received for the composite pattern and/or according to the received attributes defining appearance of the composite pattern and/or the surface on which it is to be applied (printed).

As shown at 106, the pattern generator 220 may select a plurality of paint materials and/or ink materials, collectively designated paint materials, for printing the first and second partial patterns. Specifically, the pattern generator 220 may select a first paint material for printing the first partial pattern(s) of the composite pattern and a second paint material for printing the second partial pattern(s) of the composite pattern.

The pattern generator 220 may select the paint materials to make the first and second partial patterns highly perceptible (visible) in one or more of the infrared spectral ranges, for example, NIR, SWIR and/or the like while highly imperceptible in the visible light spectral range.

Specifically, the pattern generator 220 may select the paint materials such that in the visible light spectral range the first partial pattern(s) and the second partial pattern(s) may be visually highly indistinct, indistinguishable and/or indiscernible from each other thus forming a highly uniform composite pattern and the encoded data may be highly imperceptible. However, the paint materials may be selected such that in one or more of the infrared spectral ranges, the first partial pattern(s) and the second partial pattern(s) may be highly distinct, distinguishable and/or discernible from each other such that the data encoded in the first partial pattern(s) and/or in the second partial pattern(s) may be highly perceptible.

To this end, the pattern generator 220 may select a first paint material for printing the first partial patterns and a second paint material for printing the second partial pattern(s) where the first paint material and the second paint material are infrared reflective paint materials characterized by two main light reflection characteristics. First, light reflected by the first paint material in the visible light spectral range of 400-700 nanometer deviates by less than a first value, for example, 15%, 20%, 25% and/or the like from the light reflected by the second paint material. And second, light reflected by the first paint material in one or more of the infrared spectral ranges, for example, NIR (750-1400 nanometer), SWIR (1400-3000 nanometer) and/or the like deviates by more than a second value, for example, 30%, 35%, 40% and/or the like from the light reflected by the second paint material.

The deviation in light reflection between the two paint materials may be expressed in terms of one or more visibility values and/or metrics, for example, a level of reflected light, a wavelength of the reflected light and/or the like which may translate to color, brightness, intensity, contrast and/or the like.

For brevity the paint materials selected for printing the partial patterns are designated infrared reflective paint materials. However, obviously, the deviation of the selected infrared reflective paint materials compared to each other may be to both directions. This means that the selected paint materials may be more infrared reflective or more absorptive compared to each other.

Optionally, the first and second values may be selected and/or defined according to one or more rules, parameters and/or the like of the composite pattern, the surface(s) on which the composite pattern is printed and/or the application(s) using the composite pattern.

As shown at 108, the pattern generator 220 may compute instructions for printing the composite pattern where the first partial pattern(s) are printed using the first paint material and the second partial pattern(s) are printed using the second paint material.

Figure 3A:
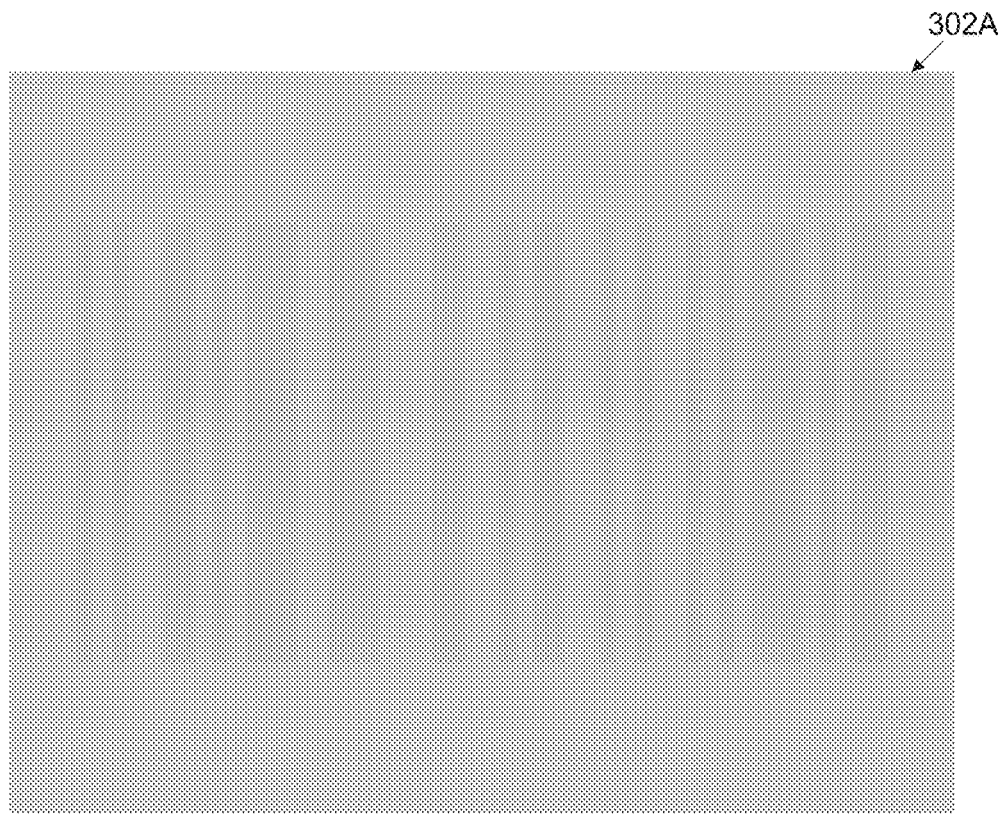
FIG. 3A, FIG. 3B and FIG. 3C are schematic illustrations of exemplary printed composite patterns encoding data in a plurality of partial patterns perceptible in infrared spectrum while imperceptible in visible light spectrum, according to some embodiments of the present invention.
Figure 3A:
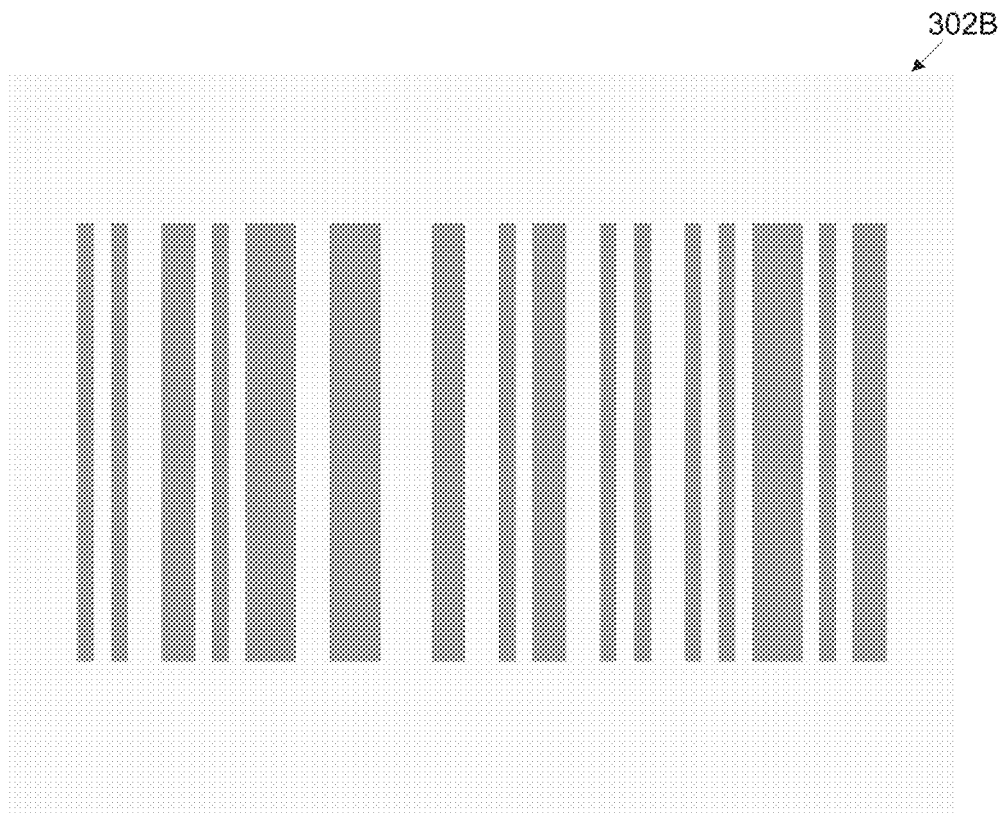
Figure 3B:
Figure 3B:
Figure 3C:
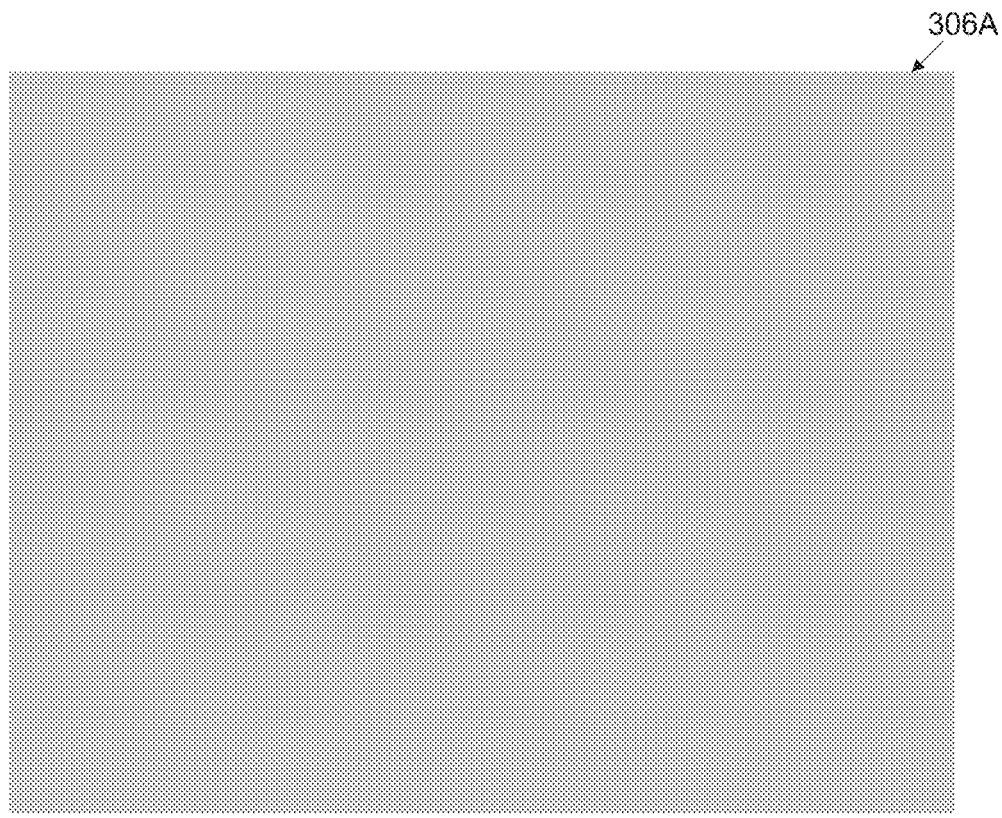
Figure 3C:
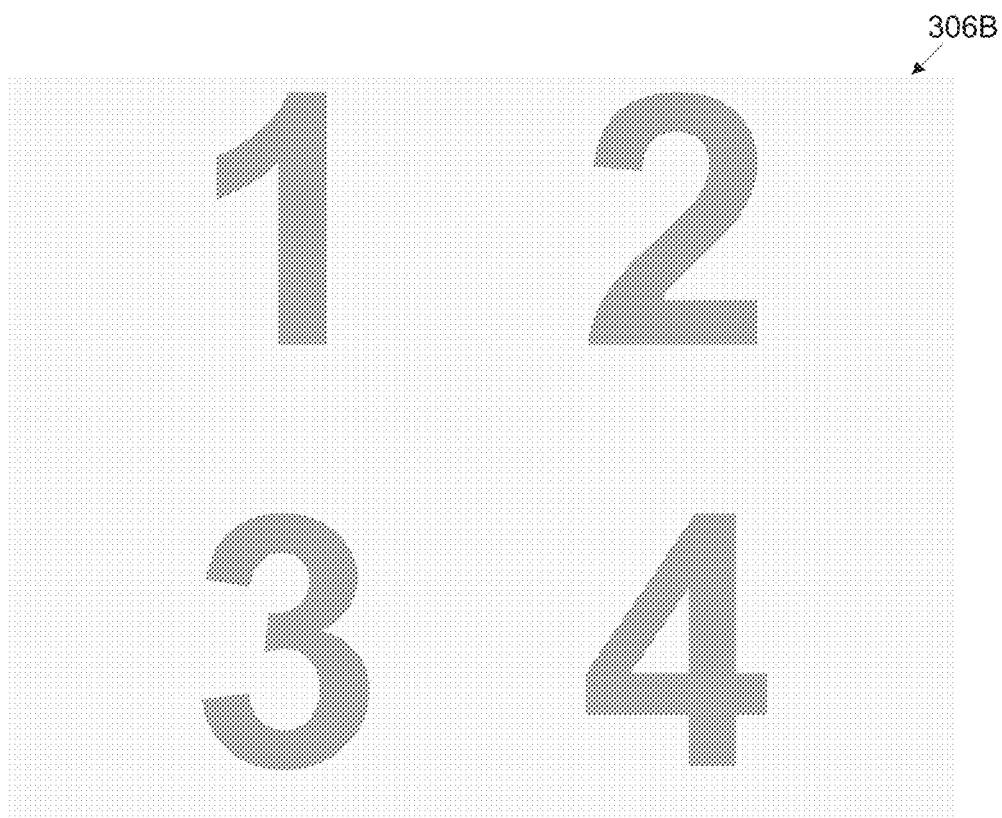

Reference is now made to FIG. 3A, FIG. 3B and FIG. 3C, which are schematic illustrations of exemplary printed composite patterns encoding data in a plurality of partial patterns perceptible in infrared spectrum while imperceptible in visible light spectrum, according to some embodiments of the present invention.

A composite pattern 302 may include a first partial pattern forming a barcode encoding data and a second partial pattern forming a background of the barcode. The first partial pattern is printed using a first paint material (ink) and the second partial pattern is printed using a second paint material (ink) where the visible light reflected by the first paint material in the visible light spectral range deviates by less than the first value from the visible light reflected by the second paint material while the infrared light reflected by the first paint material in the infrared spectral range(s) deviates by more than the second value from the infrared light reflected by the second paint material.

As seen in 302A depicting the composite pattern 302 in the visible light spectral range, the first and second partial patterns are highly imperceptible as they are significantly indistinct from each other making the composite symbol 302 appear highly uniform. The data encoded in the barcode first pattern may be therefore highly imperceptible (invisible) in the visible light spectral range.

In contrast, as seen in 302B depicting the composite pattern 302 in one of the infrared spectral ranges, for example, NIR, the first and second partial patterns are highly perceptible as they are significantly distinct from each other thus making the data encoded in the barcode first pattern highly visible.

A composite pattern 304 may include a first partial pattern forming a QR code encoding data and a second partial pattern forming a background of the QR code. The first partial pattern is printed using a first paint material which reflects visible light deviating by less than the first value from the visible light reflected by a second paint material used to paint the second partial pattern while the infrared light reflected by the first paint material may deviate by more than the second value from the infrared light reflected by the second paint material.

As seen in 304A depicting the composite pattern 304 in the visible light spectral range, the first and second partial patterns are highly imperceptible as they are significantly indistinct from each other making the composite symbol 304 appear highly uniform. The data encoded in the QR code first pattern may be therefore highly imperceptible (invisible) in the visible light spectral range.

In contrast, as seen in 304B depicting the composite pattern 304 in one of the infrared spectral ranges, for example, NIR, the first and second partial patterns are highly perceptible as they are significantly distinct from each other thus making the data encoded in the QR code first pattern highly visible.

A composite pattern 306 may include a first partial pattern in which data may be encoded using numeric encoding, for example, digits 1, 2, 3, 4 and a second partial pattern forming a background of the digits. The first partial pattern is printed using a first paint material which reflects visible light deviating by less than the first value from the visible light reflected by a second paint material used to paint the second partial pattern while the infrared light reflected by the first paint material may deviate by more than the second value from the infrared light reflected by the second paint material.

As seen in 306A depicting the composite pattern 306 in the visible light spectral range, the first and second partial patterns are highly imperceptible as they are significantly visually indistinct from each other making the composite symbol 306 appear highly uniform. The data numerically encoded in the digits may be therefore highly imperceptible (invisible) in the visible light spectral range.

In contrast, as seen in 306B depicting the composite pattern 304 in one of the infrared spectral ranges, for example, NIR, the first and second partial patterns are highly perceptible as they are visually significantly distinct from each other thus making the data encoded in the digits 1, 2, 3, 4 of the first pattern highly visible.

According to some embodiments of the present invention, the pattern generator 220 may compute the instructions for printing the composite pattern such that the plurality of partial patterns jointly forming the composite pattern are each composed of a plurality of small size blotches. The term small size (footprint, area, etc.) is of course relative and may be defined with respect to the overall size of the composite pattern. For example, the size of each of the plurality of blotches may be in a range of 0.0001% to 1% of the overall size of the composite pattern.

Printing the first and second partial patterns composed of the plurality of blotches may significantly reduce the ability to differentiate, in the visible light spectral range, between the first and second partial patterns painted using the first and second paint materials respectively. In particular, human viewers may be unable to distinguish between the blotches of the first partial pattern from the blotches of the first partial pattern since the first and second paint materials reflecting substantially similar visible light are significantly similar to begin with, are much harder to differentiate when the blotches occupy only a small portion of the area of the composite pattern where the background is unpainted.

Figure 4A:
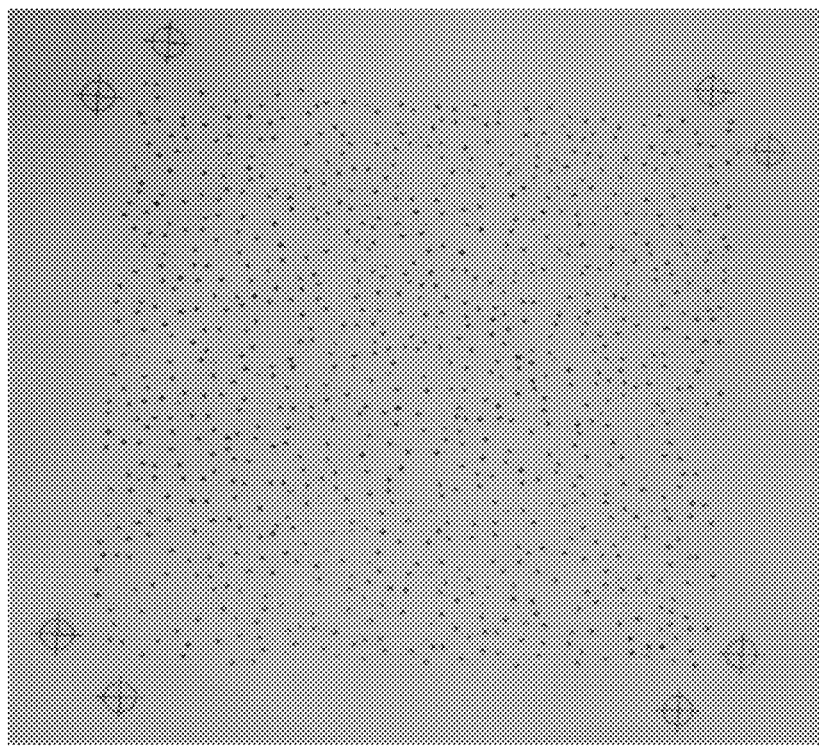
FIG. 4A and FIG. 4B are images of exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.
Figure 4A:
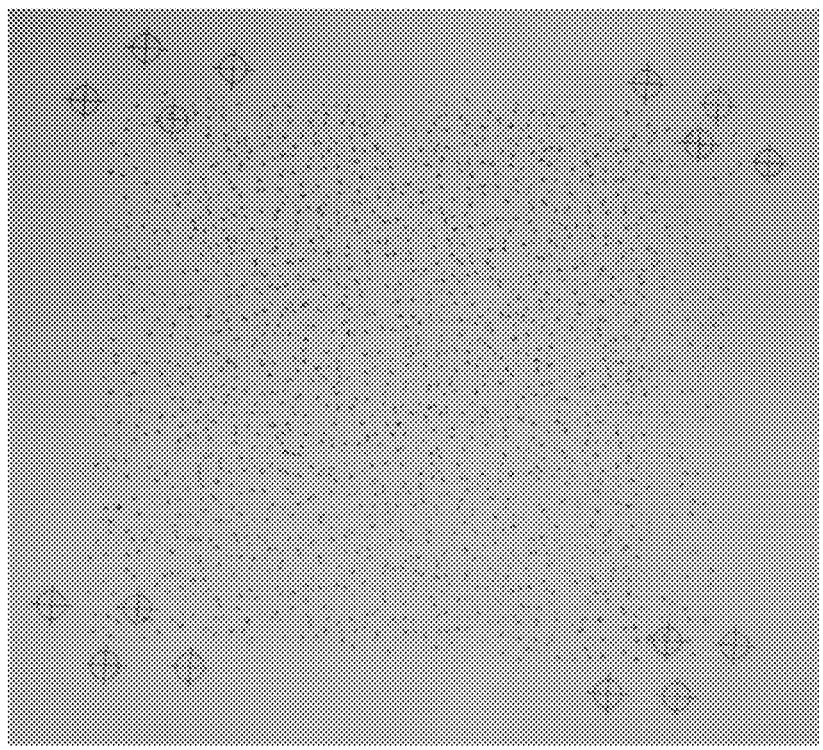
Figure 4B:
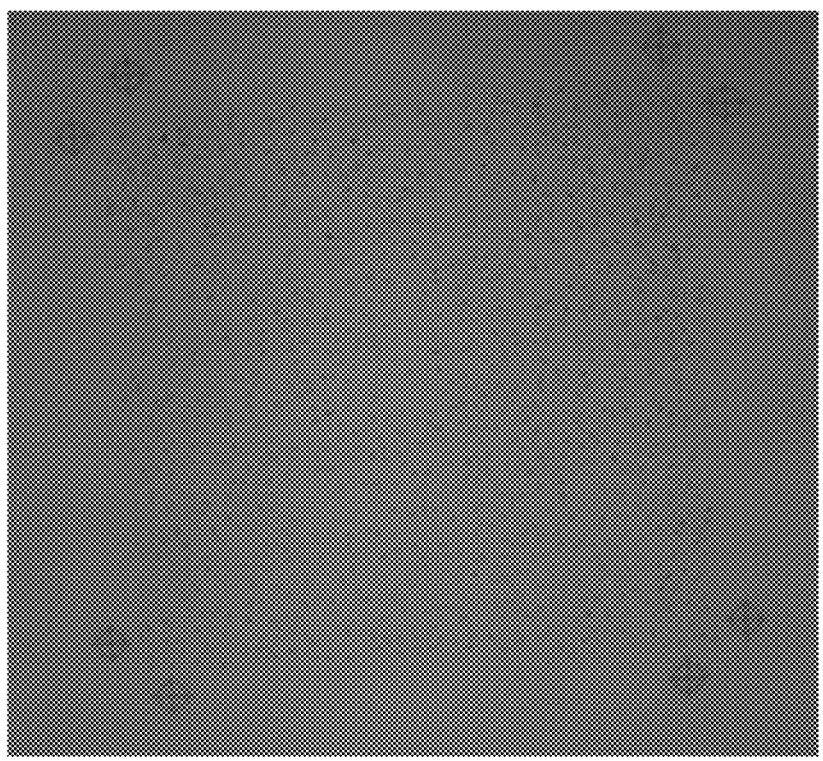
Figure 4B:
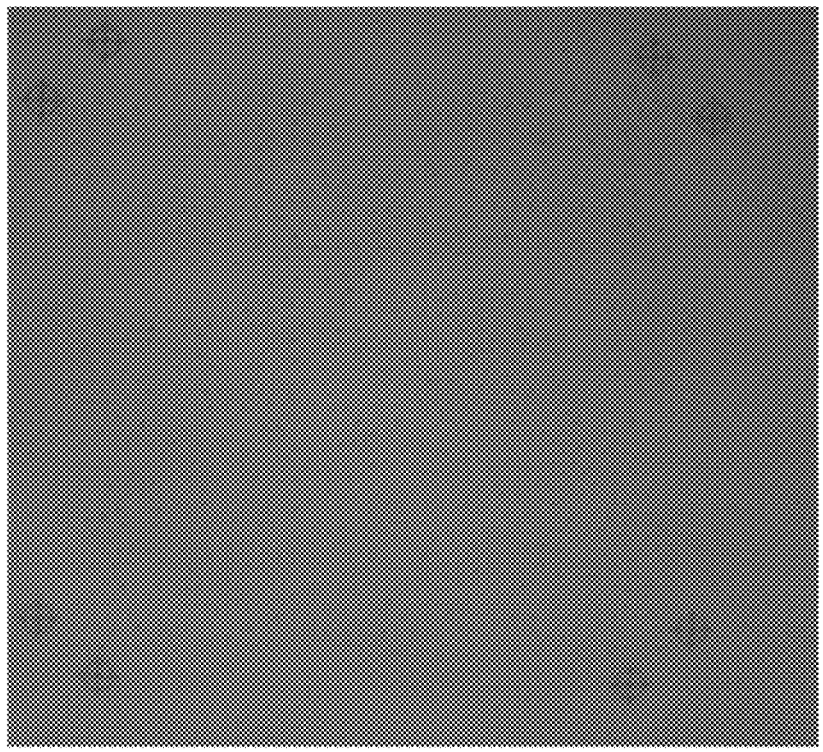

Reference is now made to FIG. 4A and FIG. 4B are images of exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.

An image 402A presents a first pattern composed of a plurality of blotches all printed using a single paint material (ink) as seen in the visible light spectral range. An image 402B presents a second pattern composed of a plurality of blotches having a similar distribution rate as the blotches of the first pattern which are printed using two paint materials (inks) which reflect light deviating by less than the first value in the visible light range. As evident, it may be very difficult for the human eye to differentiate between the first and second patterns, specifically to differentiate between the distribution (rate) of the blotches of the first pattern and the distribution (rate) of the blotches of the second pattern.

An image 402B presents the first pattern in one of the infrared spectral ranges, for example, NIR while an image 404B presents the second pattern in the NIR spectral range. As evident, the distribution of the blotches in the first pattern as seen in the NIR image 402B may be very similar to that of the visible light image 402A since all the blotches are printed using the same paint material.

On the other hand, as seen in the NIR image 404B, the distribution of the blotches in the second pattern in the NIR spectral range is different from that of the first pattern and from that of the second pattern as seen in the visible light spectrum since the blotches of the second pattern are printed using two different paint materials having different NIR reflection characteristics. As such the blotches printed using the first paint material may reflect more or less NIR light compared to the blotches printed using the second paint material and may be therefore more or less perceptible (visible) than the blotches printed using the second paint material forming a different distribution of the blotches.

The composite pattern comprising the first partial pattern and the second partial pattern each composed of a plurality of blotches may be therefore printed by printing the blotches of the first partial pattern and the blotches of the second partial pattern using the first paint material and the second paint material respectively.

Figure 5:
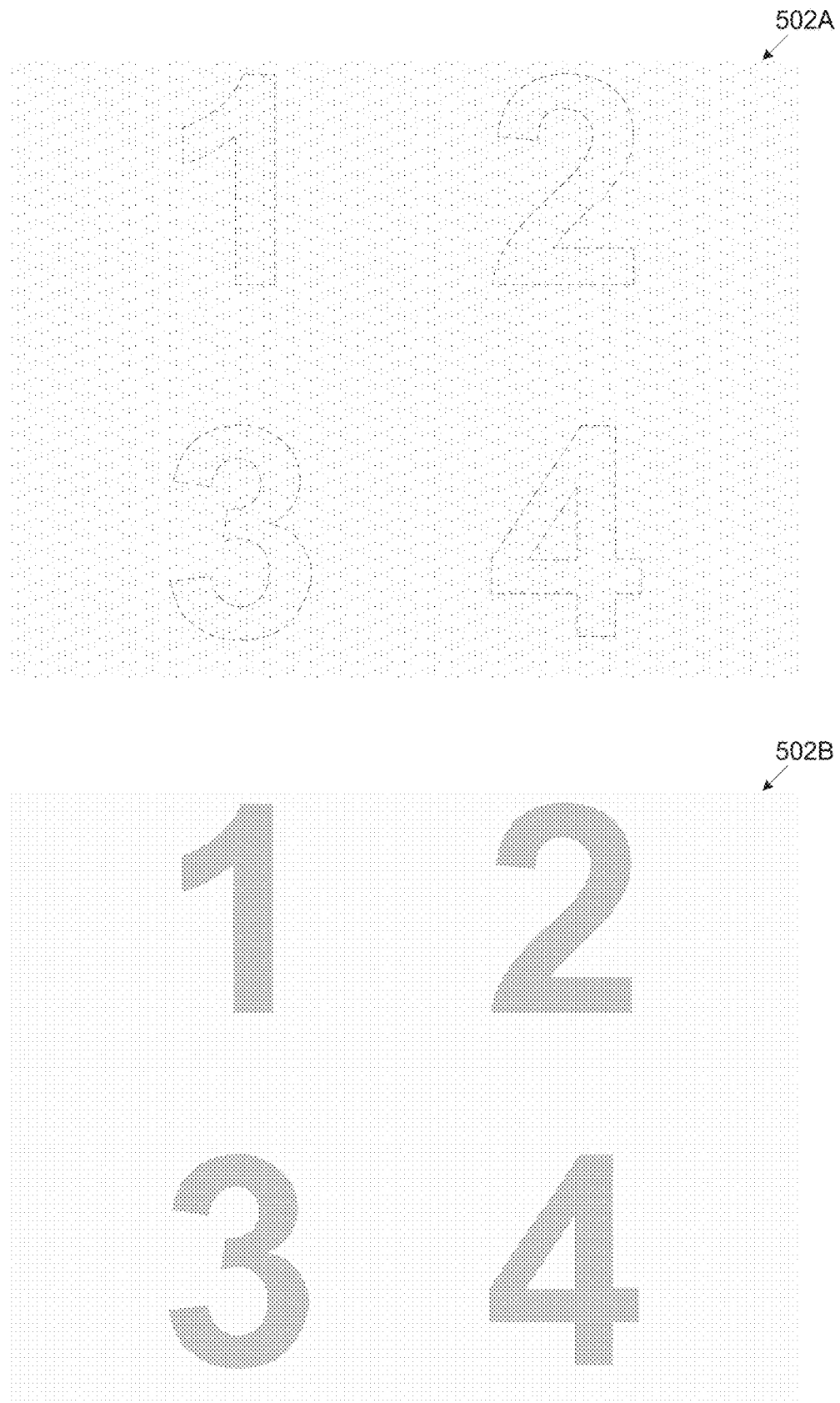
FIG. 5 is a schematic illustration of an exemplary printed composite pattern encoding data in a plurality of partial patterns constructed of a plurality of blotches perceptible in infrared spectrum while imperceptible in visible light spectrum, according to some embodiments of the present invention.

Reference is now made to FIG. 5, which is a schematic illustration of an exemplary printed composite pattern encoding data in a plurality of partial patterns constructed of a plurality of blotches perceptible in infrared spectrum while imperceptible in visible light spectrum, according to some embodiments of the present invention.

A composite pattern 502 may include a first partial pattern in which data may be encoded using numeric encoding, for example, digits 1, 2, 3, 4 and a second partial pattern forming a background of the digits. The first partial pattern is composed from a plurality of blotches printed using a first paint material and the second partial pattern is composed from a plurality of blotches printed using a second paint material. As described herein before, the first paint material reflects visible light deviating by less than the first value from the visible light reflected by the second paint material while the infrared light reflected by the first paint material may deviate by more than the second value from the infrared light reflected by the second paint material.

As seen in 502A depicting the composite pattern 502 in the visible light spectral range, the first and second partial patterns are highly imperceptible since, visually, they are significantly indistinct from each other making the composite symbol 306 appear highly uniform. The data numerically encoded in the digits may be therefore highly imperceptible (invisible) in the visible light spectral range. It should be noted that the dashed border lines of the digits are not part of the composite pattern 502 and/or of any of its partial patterns. These border lines are added to indicate the border lines between the first and second partial patterns which may be otherwise indistinguishable from each other to the human eye.

In contrast, as seen in 502B depicting the composite pattern 502 in one of the infrared spectral ranges, for example, NIR, the first and second partial patterns are highly perceptible as they visually are significantly distinct from each other thus making the data encoded in the digits 1, 2, 3, 4 of the first pattern highly visible.

Reference is made once again to FIG. 1.

As shown at 110, the pattern generator 220 may output the printing instructions for printing the composite pattern on one or more surfaces, for example, paper, fabric, metal, wood, glass and/or the like.

The pattern generator 220 may create, adjust and/or adapt the printing as known in the art according to the target printing system, device and/or apparatus applied to print the composite pattern on the surface(s).

According to some embodiments of the present invention, one or more pattern detection systems may be configured to detect and analyze one or more composite patterns, specifically the plurality of partial patterns from which each composite pattern is constructed from to decode and extract the data encoded in one or more of the partial patterns.

Figure 6:
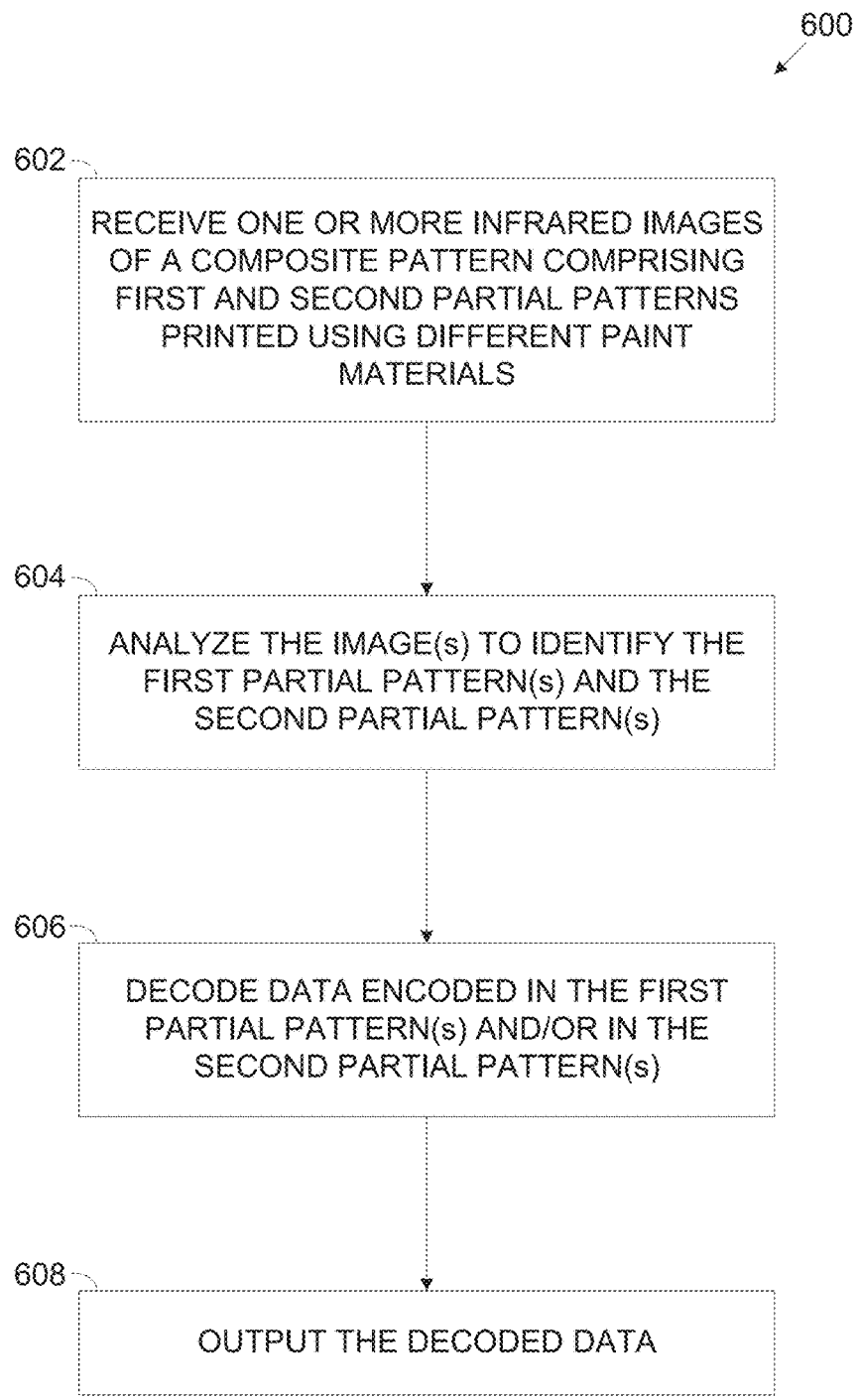
FIG. 6 is a flowchart of an exemplary process of decoding data encoded in a printed composite pattern comprising a plurality of partial patterns constructed of a plurality of blotches perceptible in infrared spectrum while imperceptible in visible light spectrum, according to some embodiments of the present invention.
Figure 7:
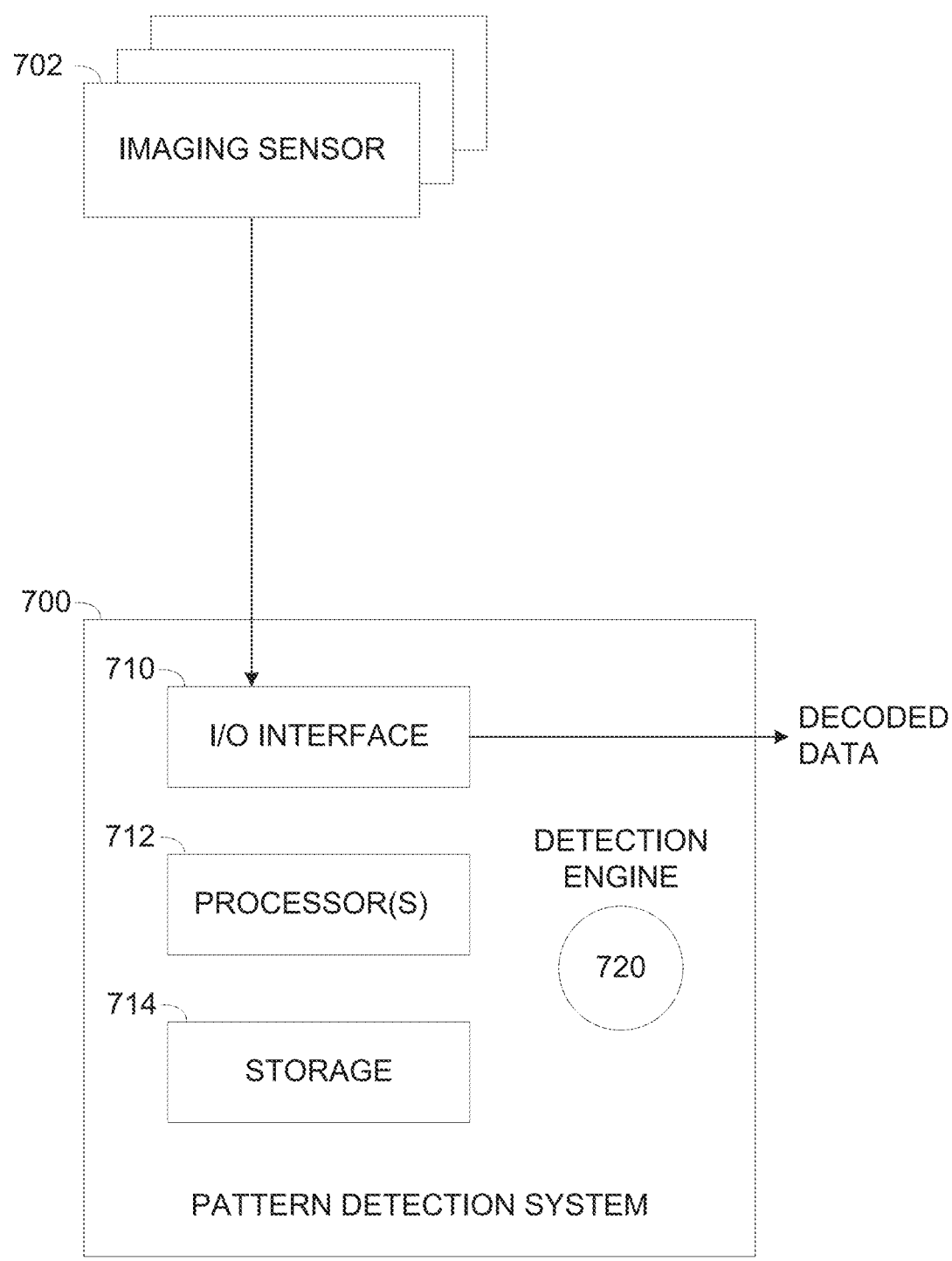
FIG. 7 is a schematic illustration of an exemplary system for decoding data encoded in a printed composite pattern comprising a plurality of partial patterns constructed of a plurality of blotches perceptible in infrared spectrum while imperceptible in visible light spectrum, according to some embodiments of the present invention.

Reference is now made to FIG. 6, which is a flowchart of an exemplary process of decoding data encoded in a printed composite pattern comprising a plurality of partial patterns constructed of a plurality of blotches perceptible in infrared spectrum while imperceptible in visible light spectrum, according to some embodiments of the present invention. Reference is also made to FIG. 7, which is a schematic illustration of an exemplary system for decoding data encoded in a printed composite pattern comprising a plurality of partial patterns constructed of a plurality of blotches perceptible in infrared spectrum while imperceptible in visible light spectrum, according to some embodiments of the present invention.

A pattern detection system, device, apparatus and/or the like collectively designated pattern detection system 700 may be configured to execute an exemplary process 600 to detect a plurality of partial patterns constructing a printed composite pattern and decode data encoded on one or more of the partial patterns. In particular, the partial patterns are printed using a different paint (ink) materials characterized by reflecting substantially similar light in the visible light spectral range while each paint material may reflect infrared light deviating from the infrared light reflected by the other paint materials.

As such, in the visible light spectral range the composite pattern may appear highly uniform since visually the partial patterns are indistinct (indistinguishable) from each other, in one or more of the infrared spectral ranges (e.g., NIR, SWIR, etc.), the partial patterns may be highly perceptible such that the pattern detection system 700 may decode and extract the data encoded in partial pattern(s).

The pattern detection system 700 may include an I/O interface 710 such as the I/O interface 210, a processor(s) 712 such as the processor(s) 212 for executing the process 600 and a storage 714 such as the storage 214 for storing data and/or code (program store).

Via the I/O interface 710, interface comprising one or more network interfaces and/or interconnection interfaces, the pattern detection system 700 may connect and/or communicate with one or more other systems, devices and/or services which may be local and/or remote, for example, a remote server, a cloud service, a cloud platform and/or the like.

Specifically, via the I/O interface 710, the pattern detection system 700 may communicate with one or more imagining sensors 702 deployed and configured to monitor and capture images of one or more composite patterns each constructed of a plurality of partial patterns encoding data. The imaging sensors 702 may include, for example, the camera, the infrared camera, the thermal mapping camera and/or the like configured to capture images of the composite patterns in one or more of the infrared spectral ranges, for example, NIR, SWIR and/or the like.

The processor(s) 712 may execute one or more software modules such as, for example, a process, a script, an application, an agent, a utility, a tool, an OS and/or the like each comprising a plurality of program instructions stored in a non-transitory medium (program store) such as the storage 714 and executed by one or more processors such as the processor(s) 712. The processor(s) 712 may optionally, integrate, utilize and/or facilitate one or more hardware elements (modules) integrated and/or utilized in the pattern generation system 200, for example, a circuit, a component, an IC, an ASIC, an FPGA, a DSP, a GPU and/or the like.

The processor(s) 712 may therefore execute one or more functional modules implemented using one or more software modules, one or more of the hardware modules and/or combination thereof. For example, the processor(s) 712 may execute a detection engine 720 functional module configured to execute the process 600.

Optionally, the object detection system 700, specifically the detection engine 720 are provided and/or utilized by one or more cloud computing services, for example, IaaS, PaaS, SaaS and/or the like provided by one or more cloud infrastructures, platforms and/or services such as, for example, Amazon AWS, Google Cloud, Microsoft Azure and/or the like. In such deployments, the detection engine 720 may communicate with the imaging sensor 702 via one or more networks to receive images of the composite pattern captured by the imaging sensors 702.

As shown at 602, the pattern detection system 700, specifically the detection engine 720 may receive one or more images of a composite pattern constructed of a plurality of partial patterns each painted using a respective infrared reflective paint material having substantially similar visible light reflections characteristics while having significantly different infrared light reflection characteristics.

Since the imaging sensor(s) 702 are configured to operate in one or more of the infrared spectral ranges (e.g. NIR, SWIR, etc.), the received image(s) may depict the composite pattern in one or more of the infrared spectral ranges.

While the composite pattern may include a plurality of partial patterns, a plurality of partial pattern types and/or a plurality of partial pattern groups, for brevity and without limitation, the description is directed to a composite pattern comprising two partial pattern types, one or more first partial patterns and one or more second partial patterns.

As shown at 604, the detection engine 720 may analyze the infrared image(s) depicting the composite pattern to identify the partial patterns of the composite pattern, specifically the first partial pattern(s) and the second partial pattern(s). In particular, the detection engine 720 may analyze the infrared image(s) to identify the first partial pattern(s) separated from the second partial pattern(s).

The detection engine 720 may analyze the image(s) using one or more methods, techniques and/or algorithms as known in the art, for example, computer vision, image processing, classification functions (classifiers), machine learning models and/or the like.

As described herein before, the first partial pattern(s) of the composite pattern is printed using a first paint (ink) material while the second partial pattern(s) of the composite pattern is printed using a second paint (ink) material where the first and second paint materials are characterized by two main light reflection characteristics. Specifically, light reflected by the first paint material in the visible light spectral range may deviate by less than the first value (e.g. 15%, 20%, 25%, etc.) from the light reflected by the second paint material while infrared light reflected by the first paint material in one or more of the infrared spectral ranges (e.g. NIR, SWIR, etc.) may deviate by more than the second value (e.g. 30%, 35%, 40%, etc.) from the infrared light reflected by the second paint material.

Since the first partial pattern(s) and the second partial pattern(s) may reflect different infrared light, based on analysis of the infrared image(s) depicting the composite pattern in the infrared spectral range(s), the detection engine 720 may therefore detect the first partial pattern(s) and the second partial pattern(s) separate from each other.

For example, the detection engine 720 may distinguish between the first partial pattern(s) and the second partial pattern(s) according to a threshold of infrared light reflection in the infrared spectral range(s). Value of the threshold may be selected and/or set in the range of the second value such that the threshold may separate between sections of the infrared image(s) mapped to the first partial pattern(s) and sections mapped to the second partial pattern(s).

The detection engine 720 may therefore analyze each of the pixels of the infrared image(s), specifically pixels mapped to the composite pattern and may compare the level of infrared reflection (intensity, brightness, etc.) to the threshold. Based on the comparison, the detection engine 720 may map pixels having intensity (infrared light reflection) exceeding the threshold to, for example, the first partial pattern(s) while pixels having intensity (infrared light reflection) which does not exceed the threshold may be mapped to the second partial pattern(s). Since the mapping selection may be arbitrary, the detection engine 720 may map the pixels the other way around, i.e., pixels having intensity exceeding the threshold may be mapped to the second partial pattern(s) while pixels having intensity which does not exceed the threshold may be mapped to the first partial pattern(s).

Optionally, the detection engine 720 may apply one or more background flattening methods, techniques and/or algorithms as known in the art to flatten one or more of the infrared image(s) before analyzing the image(s) to identify the partial patterns of the composite pattern. The flattening may be applied to resolve, remove and/or reduce irregularities in the image(s) which may result, for example, from non-uniform illumination of the image, scattered light and increase a statistically constant value across each of the infrared image(s).

Flattening the infrared image(s) may be of particular importance and effect for images depicting composite patterns constructed of partial patterns composed of a plurality of blotches where the background may suffer significant irregularities and/or non-uniformities.

Figure 8:
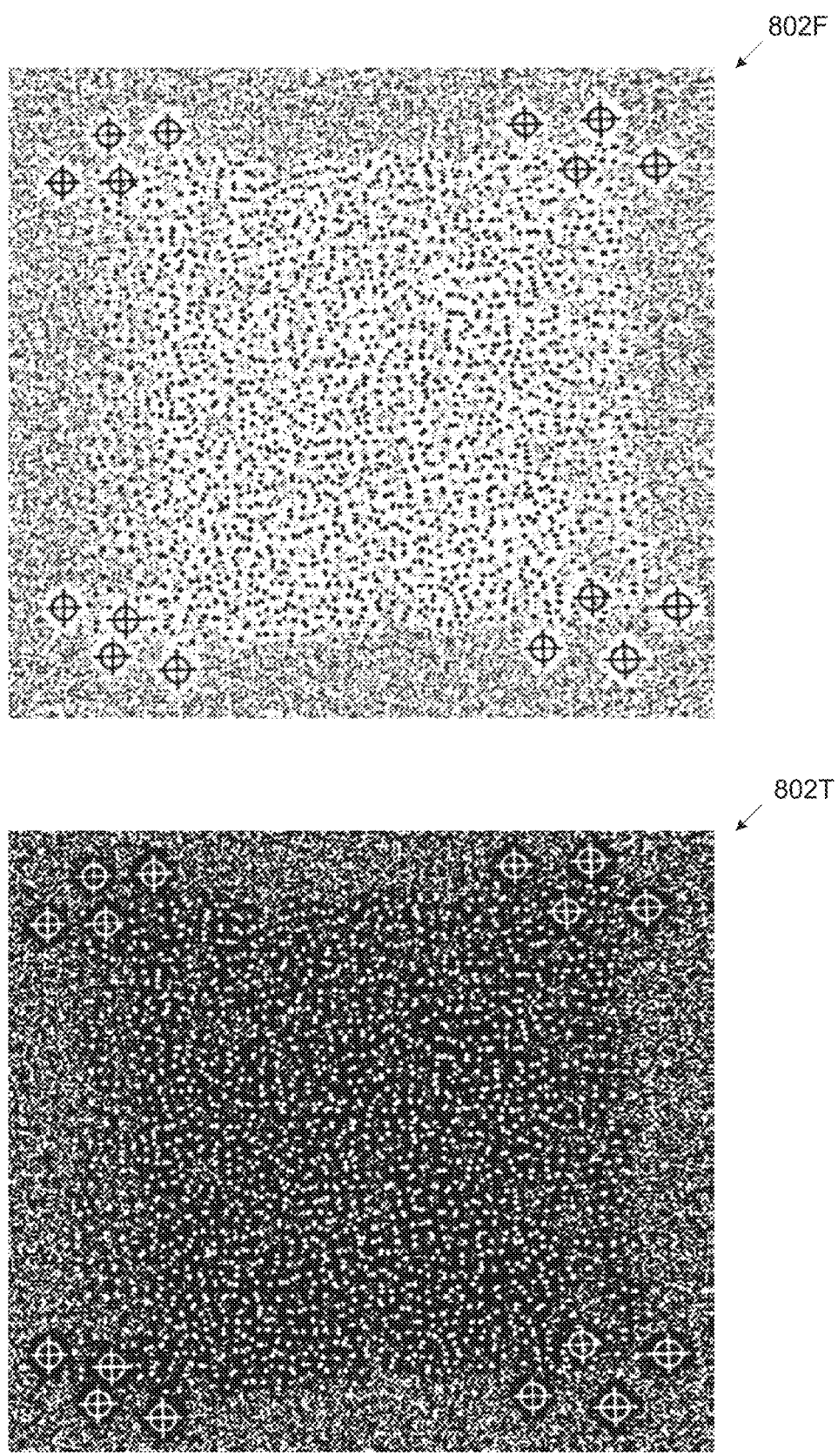
FIG. 8 presents images of an exemplary composite pattern constructed of a plurality of blotches printed using single paint material versus patterns constructed of a plurality of blotches printed using two paint materials having different reflection characteristics in infrared spectrum and in visible light spectrum after flattened and applied with binary separation, according to some embodiments of the present invention.

Reference is now made to FIG. 8, which presents images of an exemplary composite pattern constructed of a plurality of blotches printed using single paint material versus patterns constructed of a plurality of blotches printed using two paint materials having different reflection characteristics in infrared spectrum and in visible light spectrum after flattened and applied with binary separation, according to some embodiments of the present invention.

An 802F presents a certain pattern 802 such as the pattern composed of a plurality of blotches after flattened by a detection engine such as the detection engine 720 to reduce irregularities in the background of the image. An image 802T presents the certain pattern 802 after the detection engine 720 applies the binary separation according to a selected threshold in order to map each of the pixels of the certain pattern 802 to one of the partial patterns constituting the composite pattern.

Reference is made once again to FIG. 6.

As shown at 606, the detection engine 720 may decode the data encoded in the first partial pattern(s), in the second partial pattern(s) and/or in a combination thereof.

For example, assuming the detection engine 720 analyzes the image 302B, the detection engine 720 may identify the first partial pattern expressing the barcode and may decode and extract the data encoded in the barcode. In another example, assuming the detection engine 720 analyzes the image 304B, the detection engine 720 may identify the first partial pattern expressing the QR code and may decode and extract the data encoded in the QR code. In another example, assuming the detection engine 720 analyzes the image 402B, the detection engine 720 may identify the first partial pattern composed of the plurality of blotches expressing the numeric coding and may decode the data encoded in the digits 1, 2, 3, 4.

As shown at 608, the detection engine 720 may output the decoded data extracted from the first partial pattern(s), the second partial pattern(s) and/or the combination thereof.

The detection engine 720 may output the decoded data to one or more devices, apparatuses, systems, services and/or platforms which may make use of the decoded data for one or more applications. For example, the decoded information may comprise position or road information provided by a traffic sign or road mark, which may be used by one or more car navigation and/or control applications. As another example, the decoded data may encode a Uniform Resource Locator (URL) or serial number, which may be used to retrieve information retrieval about the marked object, for example, a product, e.g. a composition of the product, a link to the product page, date of expiry, a PKI-signed certificate to the authenticity or freshness of the product, and/or the like.

Described herein after are some experiments demonstrating the advantages of creating and printing the composite pattern using the blotches scheme, specifically printing the partial patterns jointly constructing the composite pattern where each of the partial patterns composes a plurality of blotches.

Printing the composite pattern as a collection of blotches printed using different paint materials having different infrared reflection attributes to form the partial patterns may significantly reduce the ability to discern between the partial patterns and therefore reduce potential visual clutter that may overload human perception. Infrared capable machines, i.e., systems on the other hand may significantly benefit from additional data encoded in patterns imperceptible by human users.

Figure 9A:
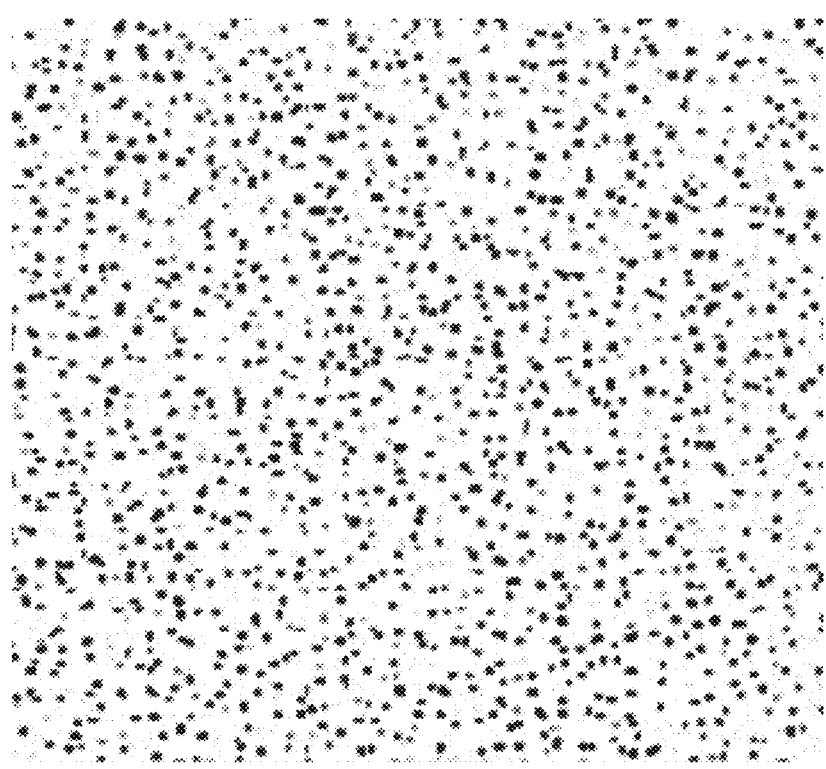
FIG. 9A and FIG. 9B present processed images of exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.
Figure 9A:
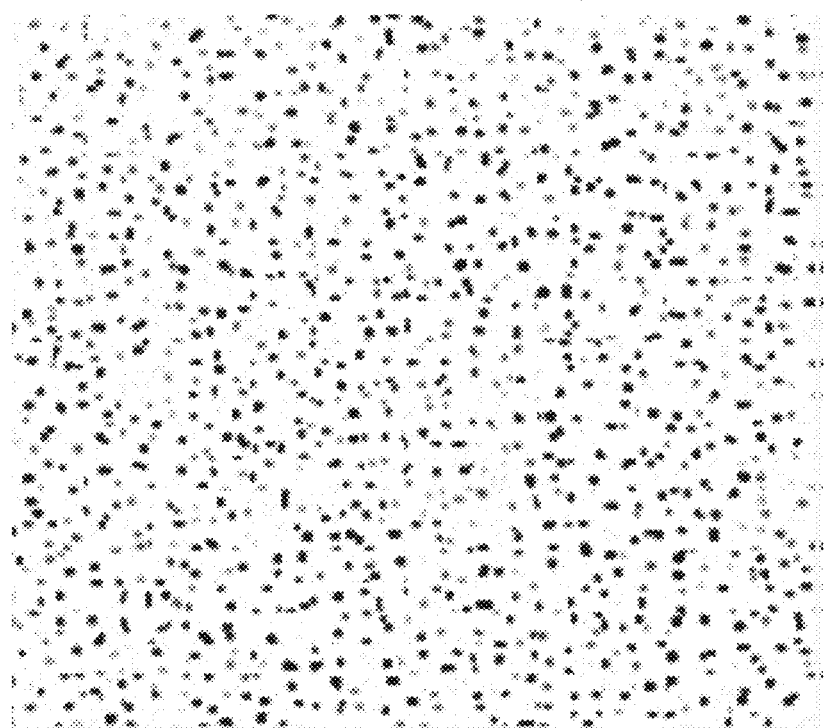
Figure 9B:
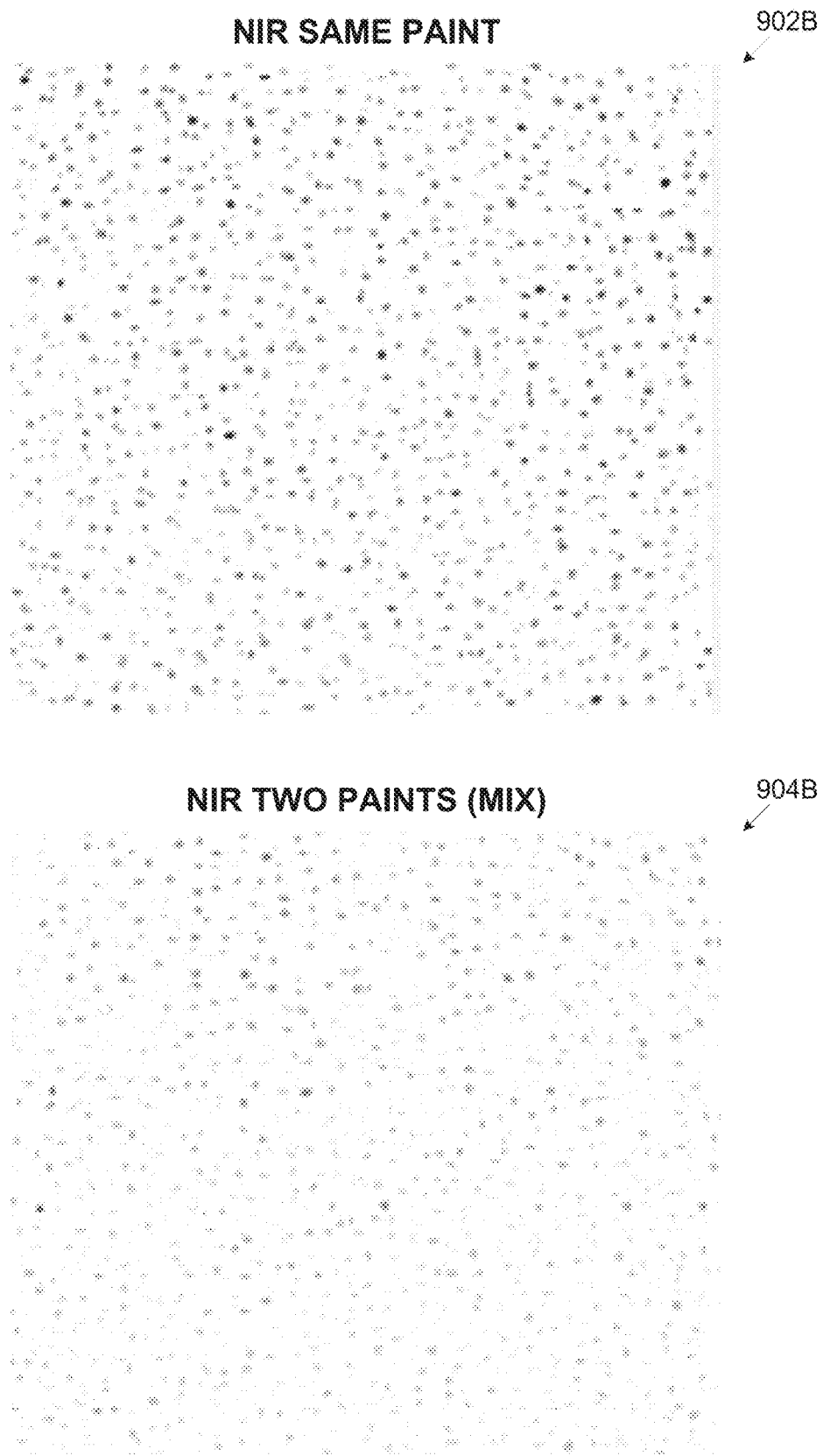

Reference is now made to FIG. 9A and FIG. 9B presenting processed images of exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.

An image 902A is an image captured in visible light spectral range of a first exemplary pattern composed of a plurality of blotches printed using a single paint material, for example, the first paint material. An image 904A is an image captured in visible light spectral range of a second exemplary pattern also composed of a plurality of blotches having similar distribution as the first pattern but in which the blotches are printed using two paint materials, for example, the first paint material and the second paint material.

As described herein before, the first and second paint materials may reflect substantially similar visible light while reflecting significantly different infrared light in one or more of the infrared spectral ranges.

Moreover, the images 902A and 904A are flattened by a detection engine such as the detection engine 720 and are further processed to apply binary separation according to a threshold value selected in the range of the second value.

As evident, even after flattening and binary separation (binarization), the distribution of the blotches may appear very similar in the images 902A and 904A since, in the visible light spectral range, the first and second paint materials may reflect substantially similar light making the blotches printed using the first and second paint materials practically indistinct.

An image 902B is an image of the first pattern captured in NIR spectral range which is further flattened and applied with binary separation according to a certain threshold. Complementary, an image 904B is an image of the second pattern captured in NIR spectral range which is further flattened and applied with binary separation according to a certain threshold.

As evident, the distribution of the blotches in the image 902B may appear different from the distribution of the blotches in the image 904B since, in the NIR spectral range, the first and second paint materials may reflect light differently which may make the blotches printed using the first paint material more or less perceptible compared to the blotches printed using the second paint material.

Several metrics, formulations and/or computations may be applied to demonstrate the high perceptibility of the blotches in the infrared spectral range(s) compared to the perceptibility of the blotches in the visible light spectral range.

Figure 10:
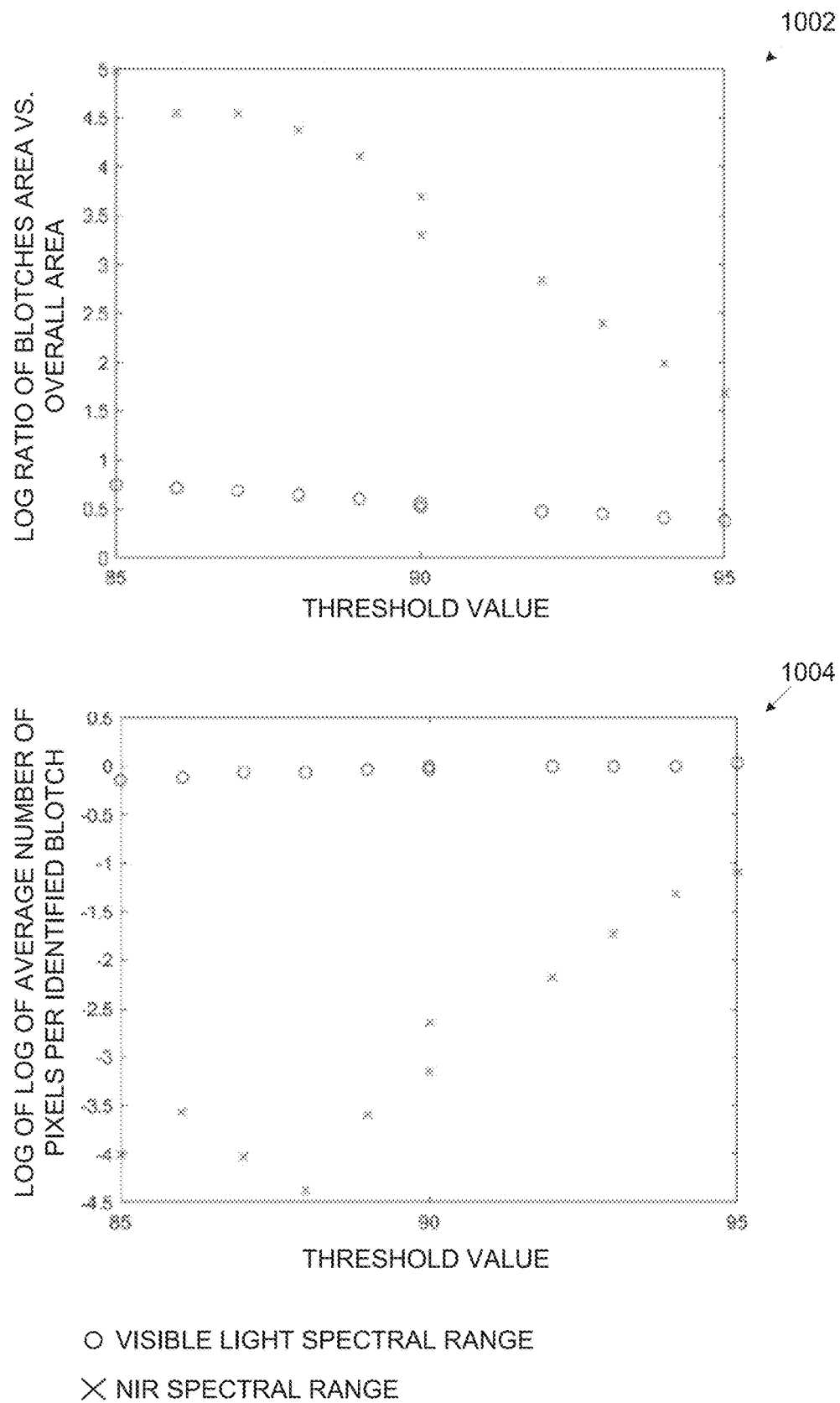
FIG. 10 presents graph charts expressing differentiation characteristics in visible spectrum and infrared spectrum of an exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.

Reference is now made to FIG. 10, which presents graph charts expressing differentiation characteristics in visible spectrum and infrared spectrum of an exemplary composite patterns constructed of a plurality of blotches printed using single paint material versus patterns constructed of a plurality of blotches printed using two paint materials having different reflection characteristics in infrared spectrum and in visible light spectrum, according to some embodiments of the present invention.

Graph charts 1002 and 1004 present two exemplary metrics demonstrating the superior perceptibility of the blotches in the infrared spectral range(s) compared to their perceptibility in the visible light spectral range.

The graph chart 1002 presents a first exemplary metric expressed by a Log value computed for a ratio between an area occupied by the blotches compared to an overall area of the pattern captured for a pattern composed of a plurality of blotches all printed using a single paint material vs. a similar distribution pattern composed of a plurality of blotches printed using the first and second paint material.

As seen in the graph chart 1002, the Log value of the ratio in the visible light spectral range is very close to 1 indicating the area occupied by the blotches compared to an overall area of the pattern is very similar for the two patterns in the visible light spectrum since the two paint materials may reflect substantially similar visible light thus appearing as single paint material.

However, as also seen in the graph chart 1002, the Log value of the ratio in the NIR spectral range is very high, <<1:2, meaning that in the NIR spectrum the blotches printed using different paint materials may be distinguishable from each other such that only the high intensity blotches are sufficiently perceptible thus occupying a reduced area of the overall pattern.

As seen in the graph chart 1002, adjusting the value of the threshold, specifically in the range of the second value to differentiate between the blotches in the NIR spectral range may affect the ratio Log value since a different number of blotches may be detected in the NIR spectral range.

The graph chart 1004 presents a second exemplary metric expressed by a Log of a Log of an average number of pixels per each blotch of the patterns identified in the NIR spectral range vs. visible light spectral range.

As seen in the graph chart 1004, the Log of the Log of the average number of pixels per identified blotch in the visible light spectral range is very similar for the first and second patterns indicating that in the visible light range the same number of blotches is identified for the two patterns since the two paint materials may reflect substantially similar visible light thus appearing as single paint material.

However, as also seen in the graph chart 1004, the Log of the Log of the average number of pixels per identified blotch in the NIR spectral range is very different from 1 and is in fact quite low indicating that significantly less blotches are identified in the NIT spectral range specifically the higher intensity, i.e. the higher reflecting blotches.

As seen in the graph chart 1004, similarly to the graph chart 1002, adjusting the value of the threshold, specifically in the range of the second value to differentiate between the blotches in the NIR spectral range may affect the Log of the Log of the average number of pixels since a different number of blotches may be detected in the NIR spectral range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms infrared reflective and/or absorptive paint materials and imaging sensor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated to numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of decoding data encoded in patterns perceptible in infrared spectral range, comprising:
    using at least one processor for:
        receiving at least one infrared image depicting, in at least one infrared spectral range, a composite printed pattern comprising at least a first partial pattern printed using a first paint material and a second partial pattern printed using a second paint material, the first and second paint materials are characterized by: (1) light reflected by the first paint material in visible light spectral range deviates less than a first value from the light reflected by the second paint material, and (2) light reflected by the first paint material in the at least one infrared spectral range deviates more than a second value from the light reflected by the second paint material;

analyzing the at least one infrared image to identify the first partial pattern and/or the second partial pattern separated from each other; and decoding data encoded in the first partial pattern and/or in the second partial pattern;

wherein the first partial pattern and the second partial pattern are each composed of a plurality of blotches.

2. The method of claim 1, wherein the first value equals 20% and the second value equals 35%.

3. The method of claim 1, wherein the at least one infrared spectral range is a member of a group consisting of: near infrared (NIR) having a wavelength in a range of 750-1400 nanometer, and short wave infrared (SWIR) having a wavelength in a range of 1400-3000 nanometer.

4. The method of claim 1, wherein the first partial pattern is distinguished from the second partial pattern according to a threshold of infrared light reflection in the at least one infrared spectral range applied to each of a plurality of pixels of the at least one infrared image, wherein each pixel reflecting infrared light exceeding the threshold is mapped to one of the first pattern or the second pattern while each pixel reflecting infrared light not exceeding the threshold is mapped to the other pattern.

5. The method of claim 4, wherein the threshold is selected in a range defined by the second value.

6. The method of claim 1, further comprising applying at least one background flattening algorithm to flatten the at least one infrared image prior to the analysis.

* * * * *